(12) United States Patent
Young et al.

(10) Patent No.: US 10,993,177 B2
(45) Date of Patent: Apr. 27, 2021

(54) NETWORK SLICE INSTANCE CREATION

(71) Applicant: Verizon Patent and Licensing Inc., Arlington, VA (US)

(72) Inventors: Kristen S. Young, Morris Plains, NJ (US); Kalyani Bogineni, Hillsborough, NJ (US); Gerardo S. Libunao, Manalapan, NJ (US); Sudhakar Reddy Patil, Flower Mound, TX (US); Samita Chakrabarti, Bedminster, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 58 days.

(21) Appl. No.: 16/219,370

(22) Filed: Dec. 13, 2018

(65) Prior Publication Data
US 2020/0196227 A1    Jun. 18, 2020

(51) Int. Cl.
| | | |
|---|---|---|
| *H04W 48/18* | (2009.01) | |
| *H04W 48/16* | (2009.01) | |
| *G06F 9/455* | (2018.01) | |
| *H04W 16/02* | (2009.01) | |
| *H04W 60/00* | (2009.01) | |

(52) U.S. Cl.
CPC ........ *H04W 48/18* (2013.01); *G06F 9/45558* (2013.01); *H04W 16/02* (2013.01); *H04W 48/16* (2013.01); *H04W 60/00* (2013.01); *G06F 2009/45595* (2013.01)

(58) Field of Classification Search
CPC ..... H04W 48/18; H04W 16/02; H04W 48/16; H04W 60/00; H04W 76/12; H04W 76/11; H04W 64/00; G06F 9/45558; G06F 2009/45595; H04L 5/0035; H04L 47/821; H04B 17/382
See application file for complete search history.

(56) References Cited

U.S. PATENT DOCUMENTS

| | | | |
|---|---|---|---|
| 2017/0303259 A1* | 10/2017 | Lee | H04W 72/048 |
| 2017/0332421 A1* | 11/2017 | Sternberg | H04W 12/0609 |
| 2017/0339688 A1* | 11/2017 | Singh | H04W 76/11 |
| 2018/0368061 A1* | 12/2018 | Yu | H04W 48/06 |
| 2019/0037409 A1* | 1/2019 | Wang | H04W 88/14 |
| 2019/0052579 A1* | 2/2019 | Senarath | H04L 47/82 |

(Continued)

FOREIGN PATENT DOCUMENTS

| | | | | |
|---|---|---|---|---|
| WO | WO-2019029310 A1 * | 2/2019 | | H04W 48/18 |
| WO | WO-2019096380 A1 * | 5/2019 | | H04W 4/50 |

OTHER PUBLICATIONS

Yang et al., translation of WO 2019/029310 A1, Jul. 10, 2018, whole document (Year: 2018).*

*Primary Examiner* — Un C Cho
*Assistant Examiner* — Jose L Perez

(57) ABSTRACT

An example method can include receiving, by a device, single-network slice selection assistance information (S-NSSAI) associated with a user equipment. The S-NSSAI can be associated with a network. The method can include determining location information associated with the user equipment, determining that a network slice instance (NSI) is to be created for the S-NSSAI, and creating an NSI based on a network service (NS) associated with the user equipment. The NSI can be created using a network function virtualization orchestrator (NFVO), associated with the network, that allocates resources, of the network, for the NSI according to the NS.

20 Claims, 7 Drawing Sheets

(56) References Cited

U.S. PATENT DOCUMENTS

| | | | |
|---|---|---|---|
| 2019/0223055 A1* | 7/2019 | Bor Yaliniz | H04W 72/0493 |
| 2019/0261157 A1* | 8/2019 | Ramle | H04W 48/18 |
| 2020/0015158 A1* | 1/2020 | So | H04W 48/16 |
| 2020/0084122 A1* | 3/2020 | Poe | H04L 41/5054 |
| 2020/0120589 A1* | 4/2020 | Velev | H04W 60/04 |
| 2020/0145833 A1* | 5/2020 | Thakolsri | H04W 48/18 |
| 2020/0177678 A1* | 6/2020 | Livanos | H04L 61/1588 |
| 2020/0178168 A1* | 6/2020 | Yang | H04W 76/11 |
| 2020/0195511 A1* | 6/2020 | Yang | H04L 41/0893 |
| 2020/0228405 A1* | 7/2020 | Fang | H04L 41/0893 |

\* cited by examiner

NETWORK SLICE INSTANCE CREATION

BACKGROUND

5G/New Radio (5G/NR) is a next generation global wireless standard. 5G/NR provides various enhancements to wireless communications, such as flexible bandwidth allocation, improved spectral efficiency, ultra-reliable low-latency communications (URLLC), beamforming, high-frequency communication (e.g., millimeter wave (mmWave)), and/or the like.

DETAILED DESCRIPTION OF PREFERRED EMBODIMENTS

Figure 1A:
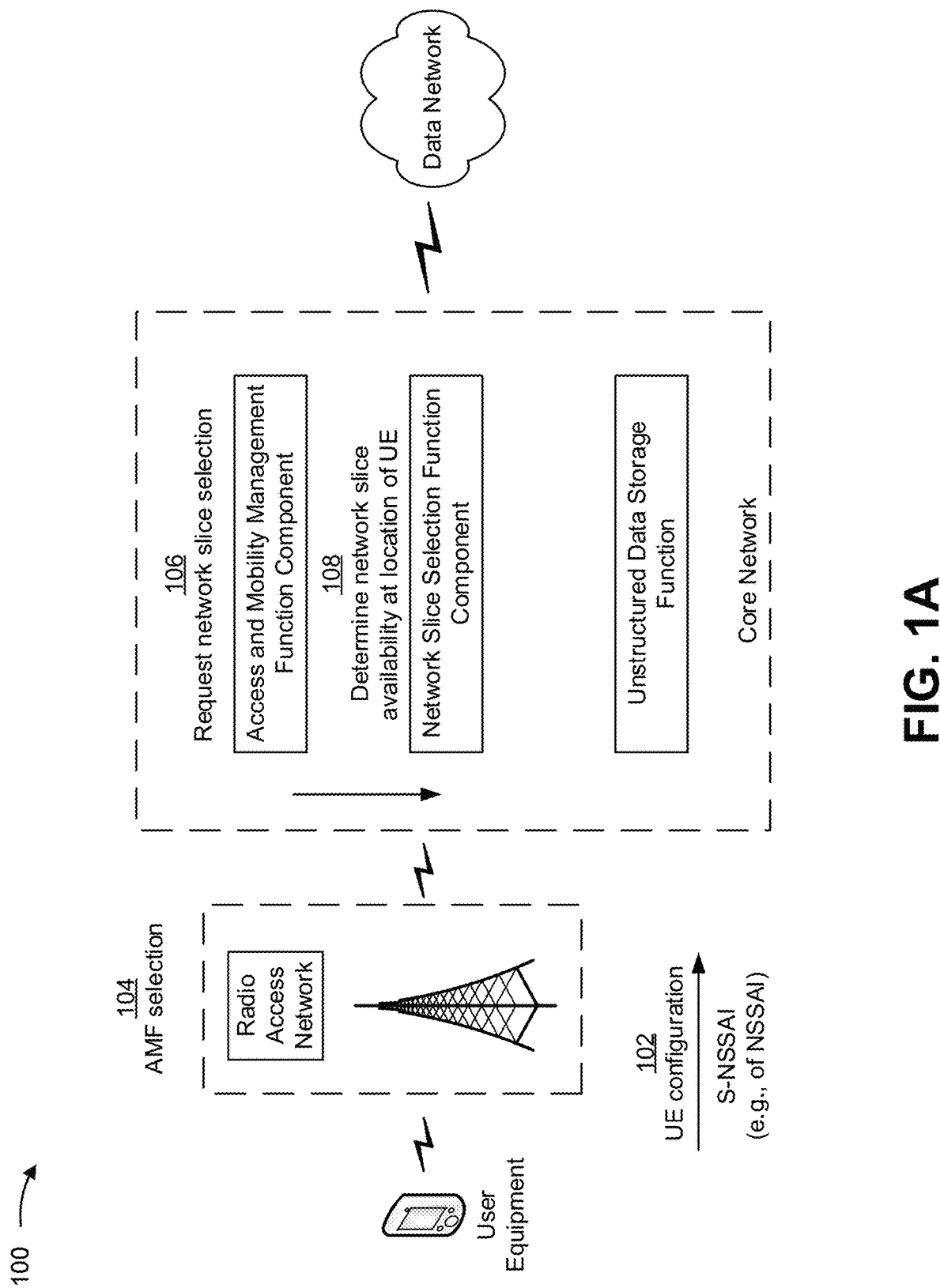
FIGS. 1A-1C is a diagram of an example implementation described herein.

The following detailed description of example implementations refers to the accompanying drawings. The same reference numbers in different drawings can identify the same or similar elements.

In a wireless telecommunications system (which can be referred to herein as "the system"), such as a 5G wireless telecommunications network, network slicing allows for multiple virtual networks to run on a single physical network to support multiple services, applications, and/or entities (e.g., end users, customers, such as organizations that provide a service to end users of the wireless telecommunications systems, and/or the like). In some instances, when a user equipment (UE) requests a connection (e.g., protocol data unit (PDU) connectivity) to the network for an application and/or service, the UE provides the network with information associated with the UE, the application, and/or the service. Such information can include network slice selection assistance information (NSSAI), which can include a collection or list of individual, single-network slice selection assistance information (S-NSSAI) (which can be referred to herein individually as "S-NSSAI" or collectively as "S-NSSAIs") that identify respective network slices associated with the UE. In such cases, a network slice selection function (NSSF) of the system can determine a network slice instance (NSI) (e.g., a virtual network of network functions (NFs) and other resources to support one or more S-NSSAIs) for the S-NSSAI. The NSSF can provide, to an access and mobility management function (AMF), an NSI identifier (NSI ID) associated with the NSI. Further, the AMF can provision a communication session, using the corresponding NSI, for the UE. However, according to previous techniques, NFs are not determined and/or selected for an NSI, an NF is not configured to cause an NSI to be created, and/or a particular NF of the wireless communication system is not configured to facilitate a creation of the NSI.

According to some implementations described herein, an NSSF (and/or other NF of a core network of a wireless telecommunication system) can be designated to automatically cause an NSI to be created based on an S-NSSAI. For example, as described herein, an NSSF can receive an S-NSSAI associated with a UE, determine location information associated with the UE, determine that an NSI is to be created for the S-NSSAI (e.g., based on the location information and/or available NFs at the location), and create the NSI for the S-NSSAI according to a network service (NS) of the UE. In some implementations, the NSSF can create the NSI in association with a network function virtualization orchestration (NFVO) component. For example, the NSSF can instruct and/or cause the NFVO to create a network service and/or onboard the NS (e.g., allocate resources of the wireless network for the NSI), as described herein.

In this way, several different stages of a process for NSI creation are automated, which can remove human subjectivity and waste from the process, and which improves speed and efficiency of the process and conserve computing resources (e.g., processor resources, memory resources, and/or the like) and/or network resources. Furthermore, some implementations described herein use a rigorous, computerized process to perform tasks or activities that were not previously performed. For example, previously, there did not exist a technique to receive an S-NSSAI associated with a UE, determine location information associated with the UE, determine that an NSI is to be created for the S-NSSAI, and create the NSI for the S-NSSAI according to a network service of the UE (e.g., in association with an NFVO). Furthermore, automating the process for creating an NSI, as described herein, conserves computing resources (e.g., processor resources, memory resources, and/or the like) and/or network resources that would otherwise be wasted by manual procedures to create an NSI, correcting errors associated with creating NSIs, and/or the like.

Moreover, automated creation of an NSI, as described herein, can conserve network resources by ensuring that only resources of the network are instantiated (or activated) for active and/or created NSIs, while other resources of the network can be dynamically and/or automatically instantiated when needed (e.g., when new NSIs are to be created). Therefore, automating the process for creating an NSI, as described herein, can conserve computing resources and/or network resources that can otherwise by wasted by statically instantiating and/or maintaining resources of the network that are not needed and/or not in use.

Furthermore, configuring an NSSF to facilitate automated NSI creation for one or more S-NSSAIs, as described herein, can permit one or more entities, such as customers of a wireless network, to individually select, define, subscribe to, and/or enable services of a wireless network. For example, the one or more entities can access a platform (e.g., an online service portal) and select and/or define an S-NSSAI and provide the S-NSSAI to the NSSF to permit the NSSF to create a corresponding NSI for the NSSAI. In this way, a user experience and/or customer experience associated with establishing an NSI for a UE and/or a plurality of UEs can be improved over previous techniques.

Figure 1B:
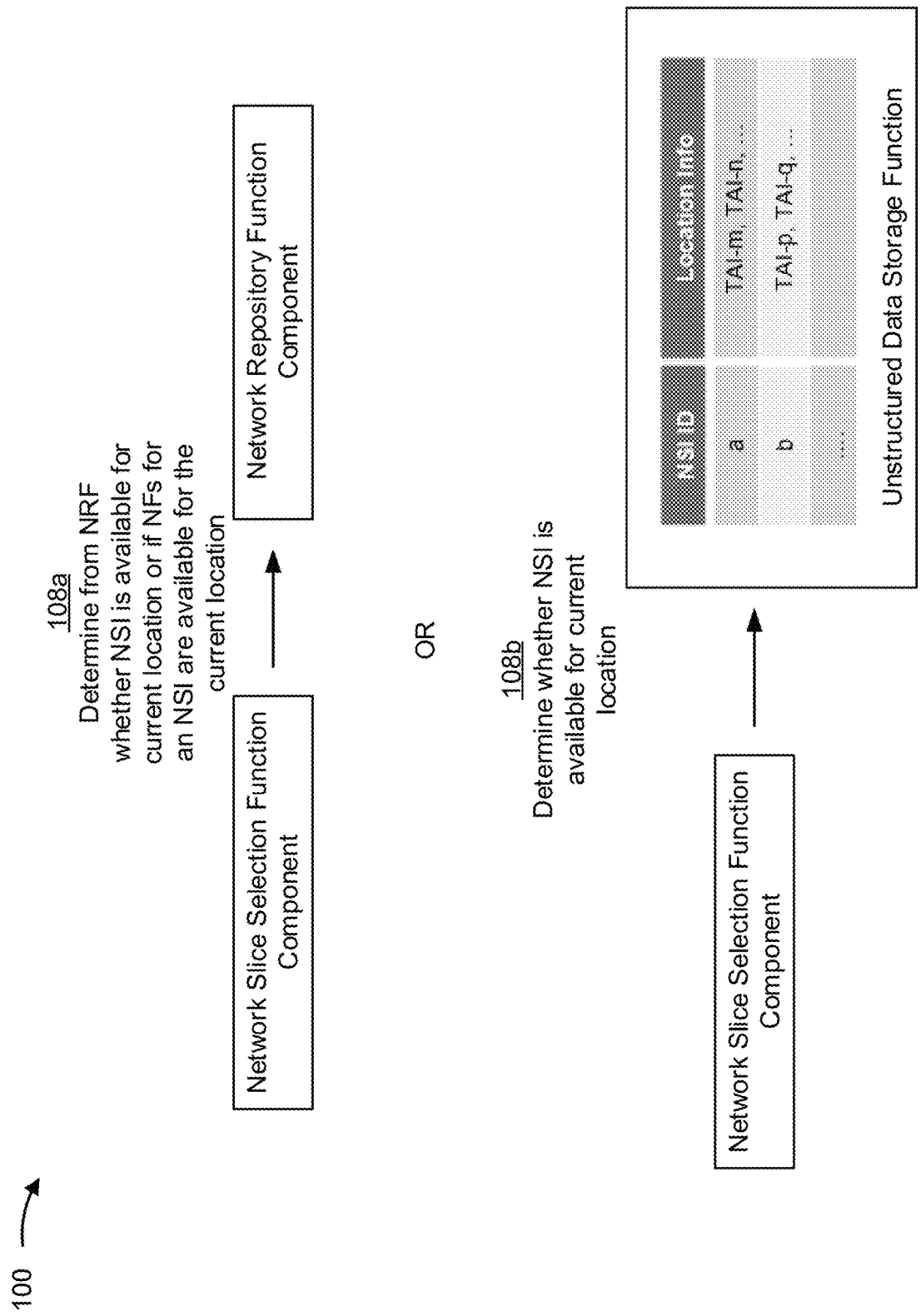
Figure 1C:
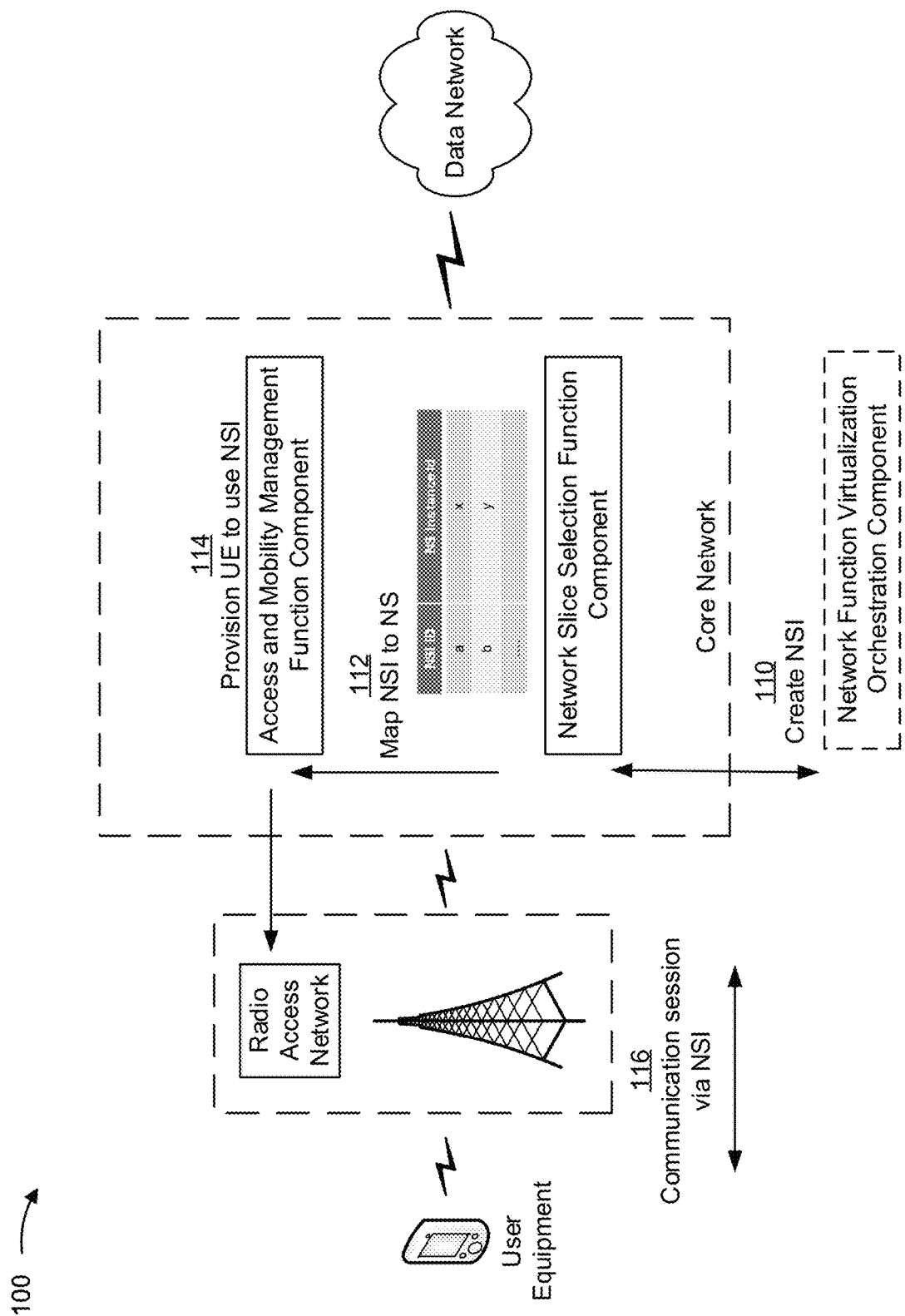

FIG. 1A-1C are diagrams of an example implementation 100 described herein. Example implementation 100 illustrates various portions of a wireless telecommunications system (referred to herein as a "wireless network"), which in some implementations can be a 5G wireless telecommunications system. Example implementation 100 can be a 5G wireless telecommunications system, a 4G wireless telecommunications system, a long-term evolution (LTE) wireless telecommunications system, an LTE-Advanced (LTE-A) wireless telecommunications system, and/or the like.

As shown in FIGS. 1A-1C, example implementation 100 can include a UE wirelessly connected to a radio access network (RAN) at a base station, which is connected to a data network via a core network. For example, the UE can run an application that involves communicating with the data network, and therefore the UE can enter into a communication session (e.g., a PDU session) with the data network via the RAN and core network. The UE and the core network can communicate application-specific data during the communication session. In some implementations, to permit the UE to enter into the communication session with the data network, the UE can send an initial request to register with the core network.

The UE of example implementation 100 can be a communication and/or computing device, such as a mobile phone, a smartphone, a laptop computer, a tablet computer, an Internet of Things device, and/or the like. The base station of example implementation 100 can include an access point of a RAN, such as a 5G next generation NodeB (gNodeB or gNB), an LTE evolved NodeB (eNodeB or eNB), and/or the like. In some implementations, the base station facilitates a communication session by communicating application-specific data between the UE and the core network.

The core network of example implementation 100 can include various types of telecommunications core networks, such as a 5G next generation core network (NG Core), an LTE evolved packet core (EPC), and/or the like. As shown in FIGS. 1A-1C, the core network, among other components and/or functions, can include an access and mobility management function (AMF) component, a network slice selection function (NSSF) component, a network repository function (NRF) component, and an unstructured data storage function (UDSF) component of the core network. In some implementations, the AMF, the NSSF, the UDSF and/or other components or functions, cannot be co-located or are not co-located (e.g., each component and/or function of the core network can be at a different location from each other component and/or function of the core network).

The AMF of example implementation 100 can provide authentication and/or authorization of the UE. In some implementations, an authentication server function (AUSF) component assists the AMF in authenticating and/or authorizing the UE. Additionally, or alternatively, the AMF can coordinate with a unified data management (UDM) component to obtain subscribed NSSAI associated with the UE. The subscribed NSSAI can include a list of S-NSSAIs that the UE is subscribed to utilize (e.g., for a communication session). In some implementations, the UE can provide a particular number of S-NSSAIs (e.g., eight S-NSSAIs or more, fifteen S-NSSAIs or more, and/or the like), within the NSSAI, when sending a UE configuration request. Therefore, the UE can provide the NSSAI to the AMF so that the UE can be associated with (e.g., registered to, assigned to, and/or the like) an NSI, which can be considered a virtual network that is implemented through various physical resources of the RAN and/or NFs of the core network. In some implementations, a network slice subnet instance (NSSI) that can be shared by multiple NSIs. In other words, the NSSI can be considered a virtual network within a virtual network. In some implementations, an NSSI can correspond to a resource layer of the wireless network.

In some implementations, the NSSF can coordinate with an NRF to determine NF availability at one or more locations of the RAN and/or core network. For example, the NRF can maintain a mapping of NFs of NSIs of the network, such that the NSSF can determine whether NFs are available for an NSI that is to be created for and/or associated with an S-NSSAI associated with the UE. As described herein, the NSSF can provide an NSI for an S-NSSAI included in the NSSAI from the UE. For example, the NSSF can maintain a mapping of S-NSSAIs to NSIs in the UDSF. In some implementations, the UDSF can be part of the NSSF and/or co-located with the NSSF. Accordingly, the NSSF can indicate an NSI selection and/or mapping of S-NSSAIs to NSIs to the AMF to permit the UE to utilize a corresponding NSI (and/or resources of the NSI) for a communication session.

In some implementations, the NSSF can determine a set of network slice policies to be considered when selecting an NSI. The set of network policies can set rules and/or requirements at a network level (e.g., for all or a subset of UEs, for all or specific applications, for all or specific geographic areas, and/or the like) and/or a user level (e.g., per UE, per application, and/or the like). The set of network slice policies, which can be maintained by a policy control function (PCF) component of the core network, can include an area capacity policy (e.g., a data rate capacity over an area), a mobility policy (e.g., location and speeds of UEs), a density policy (e.g., a number of communications sessions over an area), a guaranteed minimum data rate policy (e.g., minimum download and upload speeds), a maximum bitrate policy (e.g., maximum download and upload bitrates), a relative priority policy (e.g., relative importance of the application and/or UE compared to other applications and/or UEs), an absolute priority policy (e.g., objective importance of the application and/or UE compared to other applications and/or UEs), a latency rate policy (e.g., an end-to-end communications transmission time), a reliability policy (e.g., a communications transmission success rate), a resource scaling policy (e.g., an ability or range for scaling resources up or down), and/or the like. In some implementations, the set of network slice policies can define a low latency performance requirement (e.g., an end-to-end communications transmission time less than or equal to a threshold, such as 10 ms), a high latency performance requirement (e.g., an end-to-end communications transmission time greater than a threshold, such as 10 ms), a low reliability performance requirement (e.g., a communications transmission success rate less than a threshold, such as 99.99%), a high reliability performance requirement (e.g., a communications transmission success rate greater than or equal to a threshold, such as 99.99%), a high data rate performance requirement (e.g., download and upload speeds above a threshold, such as 50 Mbps), a low data rate performance requirement (e.g., download and upload speeds less than or equal to a threshold, such as 50 Mbps), a high traffic density requirement (e.g., greater than or equal to a threshold number of user devices per geographical area, such as 10,000 user devices per square kilometer), and/or a low traffic density requirement (e.g., less than a threshold number of user devices per geographical area, such as 10,000 user devices per square kilometer). In some implementations, the set of network slice policies can define a category for a service of a communication session.

In some implementations, the set of network slice policies can define a category for the communications session according to one or more services associated with the communication session. For example, such services can include enhanced mobile broadband (e.g., for providing enhanced broadband access in dense areas, ultra-high bandwidth access in dense areas, broadband access in public transport systems, and/or the like), connected vehicles (e.g., for providing vehicle-to-everything (V2X) communications, such as vehicle-to-vehicle (V2V) communications, vehicle-to-infrastructure (V2I) communications, vehicle-to-network (V2N) communications, and vehicle-to-pedestrian (V2P) communications, and/or the like), real-time service (e.g., for providing inter-enterprise communications, intra-enterprise communications, maps for navigation, and/or the like), enhanced multi-media (e.g., for providing broadcast services, on demand and live TV, mobile TV, augmented reality (AR), virtual reality (VR), internet protocol (IP) multi-media subsystem (IMS) service, and/or the like), internet of things (IoT) (e.g., for providing metering, lighting management in buildings and cities, environmental monitoring, traffic control, and/or the like), URLLC (e.g., for providing process automation, automated factories, tactile interaction, emergency communications, urgent healthcare, and/or the like), mission critical push-to-talk (PTT), a fixed wireless access category (e.g., for providing localized network access and/or the like), and/or the like. The data network of example implementation 100 can include various types of data networks, such as the Internet, a third-party services network, an operator services network, a private network, a wide area network, and/or the like.

As shown in FIG. 1A, and by reference number 102, the UE can send a UE configuration (e.g., a UE configuration request message) to the base station of the RAN to register the UE with the network and/or initiate a communication session between the UE and the data network. In some implementations, the UE configuration can be received to cause the core network (e.g., the NSSF) to provision an NS associated with the UE. Additionally, or alternatively, the UE configuration can be received to cause the core network (e.g., the NSSF) to update an NS associated with the UE.

As shown in FIG. 1A, the request can include an S-NSSAI. The S-NSSAI can be one of a plurality of S-NSSAIs in an NSSAI of the request. In some implementations, the request can identify the data network (e.g., via a data network identifier) that is to be involved in a communication session with the UE. According to some implementations, to send the request, the UE can run an application (e.g., a configuration application) that causes the UE to communicate with the AMF of the core network, via the RAN, to request that an S-NSSAI associated with the UE be associated with an NSI to permit the UE to engage in a communication session with the data network.

In some implementations, the UE configuration (e.g., including the S-NSSAI) can be received from an online portal in communication with the core network. For example, a portal associated with the core network can permit a user, such as a representative of one or more entities, to select, define, subscribe to, and/or enable services of the wireless network. In such cases, the UE can permit a user to generate an S-NSSAI according to the one or more services of the wireless network that are to be provided to the one or more other UEs (e.g., according to a service provided by the one or more entities). In some implementations, the one or more entities can include one or more service providers capable of communicating with an end user associated with one of the other UEs (e.g., a UE being configured to use a created NSI, as described herein) to provide the one or more services to the end user via a communication session. In some implementations, the one or more entities can be configured to monitor (e.g., via the communication session) the services at a slice level. Accordingly, different entities can be associated with different policies (e.g., according to service level agreements (SLAs) of the entities) that permit monitoring of the services at the slice level. In some implementations, an entity can be associated with and/or allocated an isolated NSI for services and/or operations of the entity (e.g., according to an SLA of the entity).

In this way, a UE configuration, including an S-NSSAI associated with the UE (and/or a plurality of other UEs) can be received, from the UE and/or an online portal associated with the UE, to permit an NSI to be identified and/or created, for the UE, according to the S-NSSAI, as described herein.

As further shown in FIG. 1A, and by reference number 104, the RAN (e.g., via the base station) can receive the UE configuration and perform an AMF selection process to identify the AMF of the core network that is to be used to set up a communication session (e.g., via an NSI) for the UE and/or register the UE with the network, as described herein. In some implementations, the RAN can detect an identifier associated with the UE (e.g., an identifier that is mapped to an AMF, a temporary identifier if the UE is not registered with the UE, and/or the like) that can be used to identify and/or select the AMF of the core network. Additionally, or alternatively, the RAN can select the AMF according to a location of the base station of the RAN and/or a location of the UE. The location can be a physical location (e.g., corresponding to a geolocation or geographical coordinates) and/or a topological location, corresponding to a network device within the wireless network relative to one or more other devices (e.g., UEs, base stations, core network components, and/or the like).

In some implementations, the AMF can be selected based on the S-NSSAI and/or an NSSAI associated with the S-NSSAI. For example, the RAN can identify an SST of the S-NSSAIs in an NSSAI and select the AMF for the UE configuration according to the SST of the S-NSSAIs. In this way, the RAN can forward the UE configuration and/or information in the UE configuration (e.g., an NSSAI, including the S-NSSAI of FIG. 1A) to the AMF to permit the AMF to instruct the NSSF to identify an NSI associated with the S-NSSAI (e.g., an existing NSI) and/or create an NSI (e.g., a new NSI that did not exist at the time the UE configuration was received), as described herein.

As further shown in FIG. 1A, and by reference number 106, the AMF can request the NSSF to perform a network slice selection. For example, based on receiving the UE configuration and/or an S-NSSAI of the UE configuration, the AMF can request the NSSF to provide an NSI for the S-NSSAI so that the UE can utilize the NSI to engage in a communication session with the data network.

In some implementations, the AMF can perform an authentication process and/or authorization process associated with the UE. For example, the AMF can perform the authentication process to authenticate the request and/or verify that the request was received from the UE identified in the request. Furthermore, the AMF can perform the authorization process to authorize the UE to register and/or communicate as part of the wireless network based on the S-NSSAI and/or one or more other characteristics of the UE.

In some implementations, the AMF can utilize a lookup table to determine whether to authenticate and/or authorize the UE. For example, the AMF can compare the information that identifies the UE with information accessible to the AMF that identifies devices that are authorized to connect with the wireless network (e.g., devices that subscribe to a wireless network provider that maintains the wireless network, devices that are capable of communicating with a type of the wireless network, and/or the like). Once the AMF authenticates and/or authorizes the UE, the AMF can authorize the NSSF to determine an NSI for the S-NSSAI as described herein.

In this way, the AMF can receive an S-NSSAI and request the NSSF to provide an NSI to permit the NSSF to determine whether the S-NSSAI is associated with an NSI (e.g., an existing NSI) or create an NSI for the S-NSSAI (e.g., if the S-NSSAI is not associated with an NSI).

As further shown in FIG. 1A, and by reference number 108, the NSSF determines network slice availability at location of UE. In some implementations, the location of the UE can correspond to a location of the base station that received the UE configuration from the UE and/or a base station that is communicatively coupled with the UE.

In some implementations, the NSSF identifies an NSI associated with the S-NSSAI and/or instantiates an NSI (e.g., along with corresponding resources or NFs of the NSI) for the S-NSSAI. The S-NSSAI can be associated with an NSI by assigning the S-NSSAI to an NSI (e.g., in a mapping). In some implementations, the NSSF can maintain one or more mappings (e.g., run-time tables) of S-NSSAIs associated with the wireless network. The one or more mappings can be maintained in the UDSF of the core network. Such S-NSSAIs could have been issued to one or more other UEs, could have been established and/or requested by entities associated with the S-NSSAIs (e.g., when the entities requested a service via a portal of the wireless network, when the entities entered into SLAs associated with the wireless network), and/or could have been previously provisioned by the wireless network to provide corresponding services associated with the S-NSSAIs. As described herein, the NSSF can utilize the one or more mappings to determine (e.g., based on the location of the UE and/or base station) whether an NSI is to be created for the S-NSSAI in order to permit the UE to engage in a communication session with the data network.

In some implementations, when the NSSF receives an S-NSSAI (e.g., from the UE configuration), the NSSF can determine whether an S-NSSAI is associated with an NSI. For example, the NSSF can refer to a mapping of S-NSSAIs to NSIs in the UDSF. In such cases, if the S-NSSAI is not associated with an NSI, the NSSF can cause an NSI to be created (e.g., to instantiate a new NSI), as described herein. If the S-NSSAI is associated with an NSI, the NSSF can determine and/or confirm that NFs of the NSI are available at the location of the location of the UE (and/or location of the base station).

In FIG. 1B, the NSSF could have determined that the received S-NSSAI is associated with an NSI. Accordingly, the NSSF can determine whether NFs associated with the NSI are available at the location of the UE.

As shown in FIG. 1B, and by reference number 108a, the NSSF can determine, from the NRF, whether an NSI is available for the current location of the UE or if the NFs for an NSI are available for the current location of the UE. For example, the NSSF can query the NRF to provide NFs associated with the NSI and/or indicate whether the NFs are available at the current location. In some implementations, the NRF can utilize a mapping of NSIs and corresponding NFs. Additionally, or alternatively, the NRF can utilize a mapping of NF availability at locations using location information associated with the NF availability. More specifically, the NRF can track NFs and/or a corresponding NS associated with the NFs using tracking area identifiers (TAI) that identify locations where the NFs and/or NSs are available. Accordingly, the query, from the NSSF to the NRF, can include an S-NSSAI, a TAI, an NF location, and/or the like to permit the NRF to determine whether the NSI is available at the current location of the UE.

In this way, the NSSF can determine whether the NSI and/or corresponding NFs of the NSI associated with the S-NSSAI are available at the current location of the UE. If the NSI and/or corresponding NFs are available at the current location, the NSSF can provide the NSI identification (NSI ID) of the NSI to the AMF. On the other hand, if the NSI and/or NFs are not available at the current location, the NSSF can cause an NSI (and/or an NS representative of the NSI) to be created (e.g., in association with the NFVO), as described herein, to permit the UE to engage in a communication session associated with the S-NSSAI.

As further shown in FIG. 1B, and by reference number 108b, additionally, or alternatively, the NSSF can determine whether the NSI is available for the current location of the UE. As shown, the NSSF can maintain a mapping of the NSI IDs to location information (TAIs) in the UDSF. Accordingly, the NSSF can identify the location information associated with the UE and determine whether the NSI associated with the S-NSSAI is available at that location. More specifically, the NSSF can identify a TAI associated with the base station of the RAN and/or a TAI associated with the AMF in the mapping and determine whether the NSI associated with the S-NSSAI is available at the corresponding location. If the NSI is available at the current location, as indicated in the mapping of the UDSF, the NSSF can provide the NSI identification (NSI ID) of the NSI to the AMF. On the other hand, if the NSI and/or NFs are not available at the current location, the NSSF can cause an NSI (and/or an NS representative of the NSI) to be created (e.g., in association with the NFVO), as described herein, to permit the UE to engage in a communication session associated with the S-NSSAI.

In this way, the NSSF can determine whether an NSI associated with an S-NSSAI received in the UE configuration from the UE is available at the location of the UE, and, if the NSI is not available at the current location, cause the NSI to be available at the current location (e.g., by creating an NS at the current location that is representative of the NSI).

As shown in FIG. 1C, and by reference number 110, the NSSF coordinates with the NFVO to create an NSI. For example, the NSSF can communicate with the NFVO, as described herein, to cause an NSI and/or an NS representative of the NSI to be created at a particular location. In some implementations, a created NS (or NS instance) can correspond to one or more NSSIs (or resource layers of the wireless network). Additionally, or alternatively, a plurality of NSs (or NS instances) can be created for an NSI, as described herein. In some implementations, an NSI can be created using one or more available NSs (e.g., corresponding to one or more NSSIs) that can be reused for the NSI.

In some implementations, the NSI can create a new NSI ID for a new NSI and/or assign a new NSI ID to an NSI that is to be created. The NSSF can utilize any suitable technique to assign an NSI ID to the NSI that is to be created (e.g., randomly, according to one or more parameters (e.g., location, UE, entity association, S-NSSAI), and/or the like).

In some implementations, the NSSF can create an NS instance with the NFVO via a management and orchestration function (e.g., using an Os-Ma-Nfvo reference point). In some implementations, the NS instance can include location information (e.g., as a constraint of the NS instance). NFVO can perform one or more processes and/or operations to instantiate resources for the NS instance. In such cases, the NFVO can create an NS instance ID and provide the NS instance ID to the NSSF.

In some implementations, the NSSF can determine whether a newly created NSI can reuse one or more NS instances associated with one or more NSSIs. For example, the NSSF can identify NS instances associated with the one or more NSSIs (and/or corresponding resource layers) that can be shared and/or used to create the new NSI. In this way, one or more NS instances can be created and/or reused for a newly created NSI that is associated with the S-NSSAI.

In this way, the NSSF can create an NSI and/or cause an NSI to be created in association with an NFVO in order to permit the AMF to instantiate a communication session between the UE and the data network using the NSI.

As further shown in FIG. 1C, and by reference number 112, the NSSF can utilize a mapping of NSIs to NS instances (e.g., of NSI IDs to NS instance IDs) and/or NSSIs to NS instances (e.g., NSSI IDs to NS instance IDs) to provision, manage, and/or maintain created NSIs. In some implementations, the mapping can include location information (e.g., TAIs) associated with the NSIs. For example, newly created NSI for the UE of example implementation 100 can be mapped to an NS instance created by the NFVO and indicated as available at the location associated with a TAI of the base station and/or AMF of example implementation 100.

In some implementations, the mapping (or run-time table) maintained by the NSSF can be synchronized with a mapping of the NRF. For example, the location information for each of the NSI IDs of the mappings can be synchronized. The mappings can be periodically synchronized and/or synchronized based on an event (e.g., a new NSI being created and/or an NSI being updated).

In some implementations, the NSSF can provide the NSI ID to the AMF. As described herein, the NSSF can provide an identifier, from the NSI run-time table, for an NSI that is associated with the S-NSSAI. Additionally, or alternatively, the NSSF can indicate that the S-NSSAI has been associated with the NSI, and the NSSF can use the NSI run-time table to perform one or more operations associated with the indicated NSI, as described herein. In some implementations, the NSI run-time table, maintained by the NSSF, can include one or more other fields other than the NSI instance ID and/or location information (e.g., to permit service optimization and/or increased efficiency).

In this way, the NSSF can indicate, to the AMF, that the S-NSSAI has been associated with an NSI, that an NSI has been created for the S-NSSAI, and/or that an NS instance has been created for the NSI for the location of the UE.

As further shown in FIG. 1C, and by reference number 114, the AMF can provision the UE to use the NSI. For example, the AMF can provision the UE to use the NSI in order to register the UE as part of the wireless network and/or enable the UE to engage in a communication session with the data network via the NSI. In some implementations, the AMF, when receiving and/or sending messages (e.g., PDUs) from and/or to the UE, can use the physical resources associated with the NSI to permit the messages to be received or sent.

As further shown in FIG. 1C, and by reference number 116, the UE can engage in the communication session via the NSI.

In this way, some implementations described herein permit an NSSF to automatically create an NSI for an S-NSSAI and/or an NS instance, for an NSI, for a location of a UE based on receiving the S-NSSAI from the UE. The created NSI can permit the UE to enter into a communication session with a data network associated with the NSSF. The NSSF can maintain a run-time table of the NSI and/or NS instances and location information to permit the NSSF to select the NSI when the S-NSSAI is received (e.g., by another UE, in a subsequent communication from the UE, and/or the like). Accordingly, some implementations described herein permit an NSSF, of a core network, to associate an S-NSSAI with a newly created NSI and NS instance in order to permit a UE to communicate with the data network using the S-NSSAI. Therefore, the NSSF can permit the UE to engage in a communication session with the data network, using the S-NSSAI, to offer the services needed by the UE, and allow for efficient allocation of resources.

In this way, several different stages of a process for creating an NSI for an S-NSSAI can remove human subjectivity and waste from the process, can improve speed and efficiency of the process, and can conserve computing resources (e.g., processor resources, memory resources, and/or the like) and/or network resources associated with the process. For example, automating the process for creating an NSI, as described herein, can conserve computing resources (e.g., processor resources, memory resources, and/or the like) and/or network resources that would otherwise be wasted using manual procedures, and/or the like.

As indicated above, FIGS. 1A-1C are provided merely as an example. Other examples can differ from what is described with regard to FIGS. 1A-1C.

Figure 2:
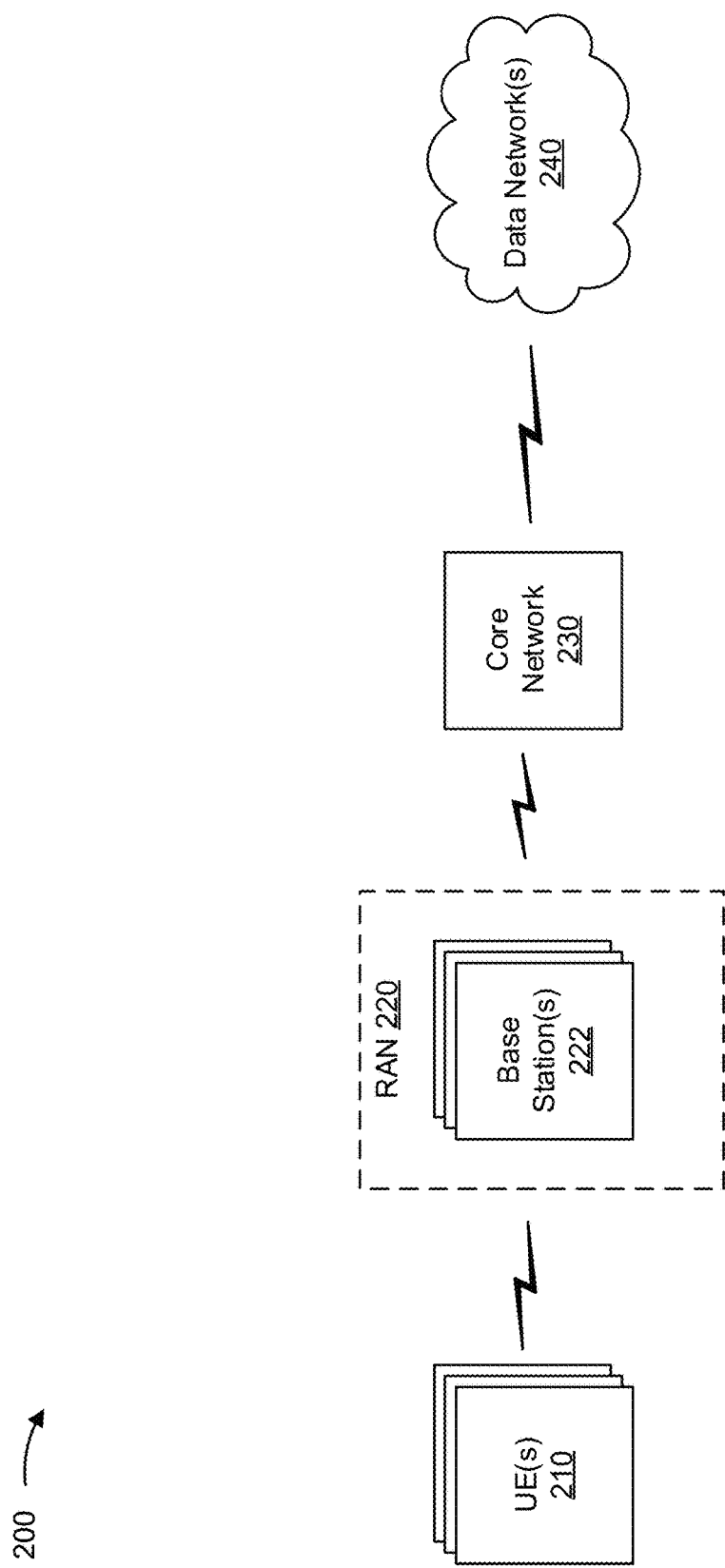
FIG. 2 is a diagram of an example environment in which systems, functional architectures, and/or methods described herein can be implemented.

FIG. 2 is a diagram of an example environment 200 in which systems and/or methods described herein can be implemented. As shown in FIG. 2, environment 200 can include a UE 210, an RAN 220, a base station 222, a core network 230, and a data network 240. Devices of environment 200 can interconnect via wired connections, wireless connections, or a combination of wired and wireless connections.

UE 210 can include one or more devices capable of communicating with base station 222 and/or a network (e.g., data network 240). For example, UE 210 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 210 can be capable of communicating using uplink (e.g., UE to base station) communications, downlink (e.g., base station to UE) communications, and/or sidelink (e.g., UE-to-UE) communications. In some implementations, UE 210 can include a machine-type communication (MTC) UE, such as an evolved or enhanced MTC (eMTC) UE. In some implementations, UE 210 can include an Internet of Things (IoT) UE, such as a narrowband IoT (NB-IoT) UE and/or the like.

Figure 3:
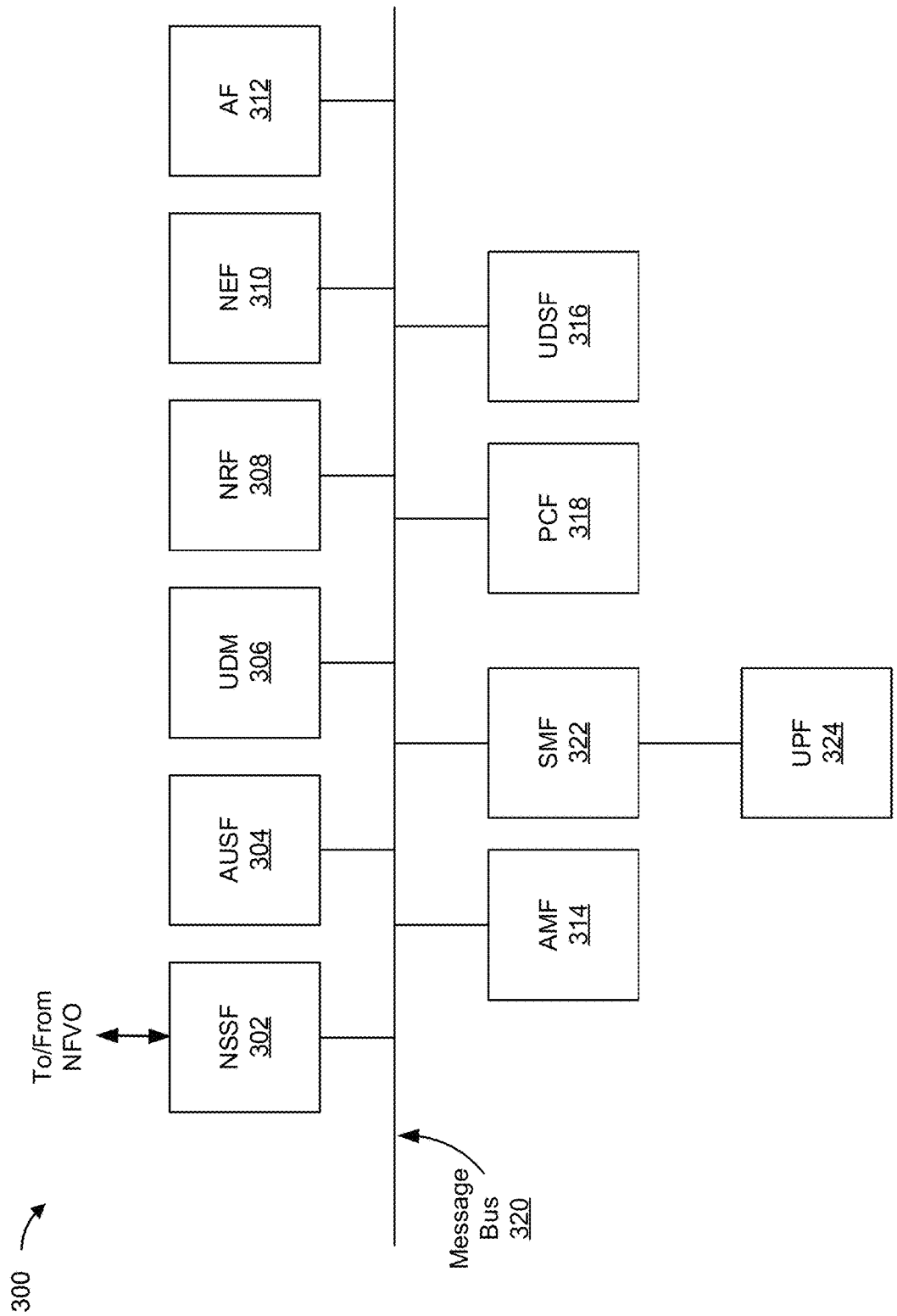
FIG. 3 is a diagram of an example functional architecture of an example core network described herein.

RAN 220 can include a base station and be operatively connected, via a wired and/or wireless connection, to the core network 230 through SMF 324 (see FIG. 3). RAN 220 can facilitate communication sessions between UEs and data network 240 by communicating application-specific data between RAN 220 and core network 230. Data network 240 can include various types of data networks, such as the Internet, a third-party services network, an operator services network, a private network, a wide area network, and/or the like.

Base station 222 includes one or more devices capable of communicating with UE 210 using a cellular radio access technology (RAT). For example, base station 222 can include a base transceiver station, a radio base station, a node B, an evolved node B (eNB), a gNB, a base station subsystem, a cellular site, a cellular tower (e.g., a cell phone tower, a mobile phone tower, etc.), an access point, a transmit receive point (TRP), a radio access node, a macrocell base station, a microcell base station, a picocell base station, a femtocell base station, or a similar type of device. Base station 222 can transfer traffic between UE 210 (e.g., using a cellular RAT), other base stations 222 (e.g., using a wireless interface or a backhaul interface, such as a wired backhaul interface), and/or data network 240. Base station 222 can provide one or more cells that cover geographic areas. Some base stations 222 can be mobile base stations. Some base stations 222 can be capable of communicating using multiple RATs.

In some implementations, base station 222 can perform scheduling and/or resource management for UEs 210 covered by base station 222 (e.g., UEs 210 covered by a cell provided by base station 222). In some implementations, base stations 222 can be controlled or coordinated by a network controller, which can perform load balancing, network-level configuration, and/or the like. The network controller can communicate with base stations 222 via a wireless or wireline backhaul. In some implementations, base station 222 can include a network controller, a self-organizing network (SON) module or component, or a similar module or component. In other words, a base station 222 can perform network control, scheduling, and/or network management functions (e.g., for other base stations 222 and/or for uplink, downlink, and/or sidelink communications of UEs 210 covered by the base station 222). In some implementations, base station 222 can include a central unit and multiple distributed units. The central unit can coordinate access control and communication with regard to the multiple distributed units. The multiple distributed units can provide UEs 210 and/or other base stations 222 with access to data network 240.

Core network 230 can include various types of core network architectures, such as a 5G NG Core (e.g., core network 300 of FIG. 3), an LTE EPC, and/or the like. In some implementations, core network 230 can be implemented on physical devices, such as a gateway, a mobility management entity, and/or the like. In some implementations, the hardware and/or software implementing core network 230 can be virtualized (e.g., through use of network function virtualization and/or software-defined networking), thereby allowing for the use of composable infrastructure when implementing core network 230. In this way, networking, storage, and compute resources can be allocated to implement the functions of core network 230 in a flexible manner as opposed to relying on dedicated hardware and software to implement these functions.

Data network 240 includes one or more wired and/or wireless data networks. For example, data network 240 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

FIG. 3 is a diagram of an example functional architecture of a core network 300 in which systems and/or methods described herein can be implemented. For example, FIG. 3 shows an example functional architecture of a 5G NG core network included in a 5G wireless telecommunications system. In some implementations, the example functional architecture can be implemented by a core network (e.g., core network 230 of FIG. 2) and/or one or more devices (e.g., a device described with respect to FIG. 4). While the example functional architecture of core network 300 shown in FIG. 3 is an example of a service-based architecture, in some implementations, core network 300 can be implemented as a reference-point architecture.

As shown in FIG. 3, core network 300 can include a number of functional elements. The functional elements can include, for example, an NSSF 302, an AUSF 304, a UDM 306, an NRF 308, an NEF 310, an AF 312, an AMF 314, a UDSF 316, a Policy Control Function (PCF) 318, a message bus 320, a Session Management Function (SMF) 322, and/or a SMF 324. These functional elements can be communicatively connected via a message bus 320, which can comprise one or more physical communication channels and/or one or more virtual communication channels. Each of the functional elements shown in FIG. 3 is implemented on one or more devices associated with a wireless telecommunications system. In some implementations, one or more of the functional elements can be implemented on physical devices, such as an access point, a base station, a gateway, a server, and/or the like. In some implementations, one or more of the functional elements can be implemented on one or more computing devices of a cloud computing environment associated with the wireless telecommunications system. In some implementations, the core network 300 can be operatively connected to an RAN 220, a data network 240, and/or the like, via wired and/or wireless connections with SMF 324.

NSSF 302 can select network slice instances for UEs, where NSSF 302 can determine a set of network slice policies to be applied at the RAN 220. By providing network slicing, NSSF 302 allows an operator to deploy multiple substantially independent end-to-end networks potentially with the same infrastructure. In some implementations, each slice can be customized for different services. NEF 310 can support the exposure of capabilities and/or events in the wireless telecommunications system to help other entities in the wireless telecommunications system discover network services and/or utilize network resources efficiently.

AUSF 304 can act as an authentication server and support the process of authenticating UEs in the wireless telecommunications system. UDM 306 can store subscriber data and profiles in the wireless telecommunications system. UDM 306 can be used for fixed access, mobile access, and/or the like, in core network 230.

NRF 308 can indicate available NFs at one or more locations as described herein. In some implementations, NRF 308 can maintain a mapping that is synchronized with an NSI run-time table maintained by NSSF 302, as described herein.

AF 312 can determine whether UEs provide preferences for a set of network slice policies and support application influence on traffic routing, access to NEF 310, policy control, and/or the like. AMF 314 can provide authentication and authorization of UEs. UDSF 316 includes one or more data structures configured to store information, mappings, and/or the like associated with the core network 300. PCF 318 can provide a policy framework that incorporates network slicing, roaming, packet processing, mobility management, and/or the like.

SMF 322 can support establishment, modification, and release of communications sessions in the wireless telecommunications system. For example, SMF 322 can configure traffic steering policies at SMF 324, enforce UE IP address allocation and policies, and/or the like. AMF 314 and SMF 322 can act as a termination point for Non-Access Stratum (NAS) signaling, mobility management, and/or the like. SMF 322 can act as a termination point for session management related to NAS. RAN 220 can send information (e.g., the information that identifies the UE) to AMF 314 and/or SMF 322 via PCF 318.

SMF 324 can serve as an anchor point for intra/inter RAT mobility. SMF 324 can apply rules to packets, such as rules pertaining to packet routing, traffic reporting, handling user plane QoS, and/or the like. SMF 324 can determine an attribute of application-specific data that is communicated in a communications session. SMF 324 can receive information (e.g., the information that identifies the communications attribute of the application) from RAN 220 via SMF 322 or an application programming interface (API). Message bus 320 represents a communication structure for communication among the functional elements. In other words, message bus 320 can permit communication between two or more functional elements. Message bus 320 can be a message bus, a hypertext transfer protocol (HTTP)/2 proxy server, and/or the like.

Figure 4:
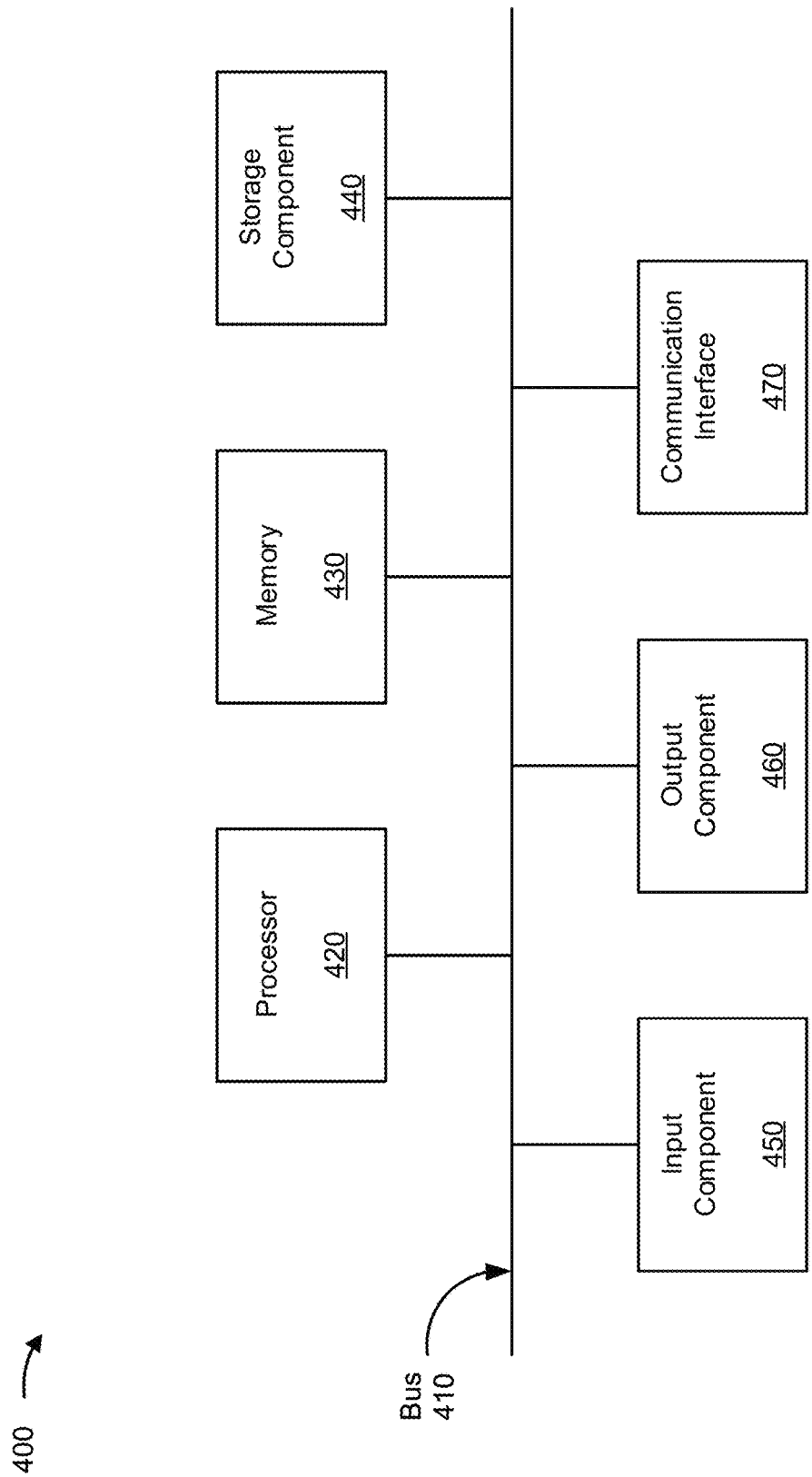
FIG. 4 is a diagram of example components of one or more devices of FIGS. 2 and/or 3.

FIG. 4 is a diagram of example components of a device 400. Device 400 can correspond to UE 210, RAN 220, base station 222, NSSF 302, AUSF 304, UDM 306, NRF 308, NEF 310, AF 312, UDSF 316, PCF 318, message bus 320, SMF 322, and/or SMF 324. In some implementations UE 210, RAN 220, and/or base station 222 can include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, or the like.

Device 400 can perform one or more processes described herein. Device 400 can perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
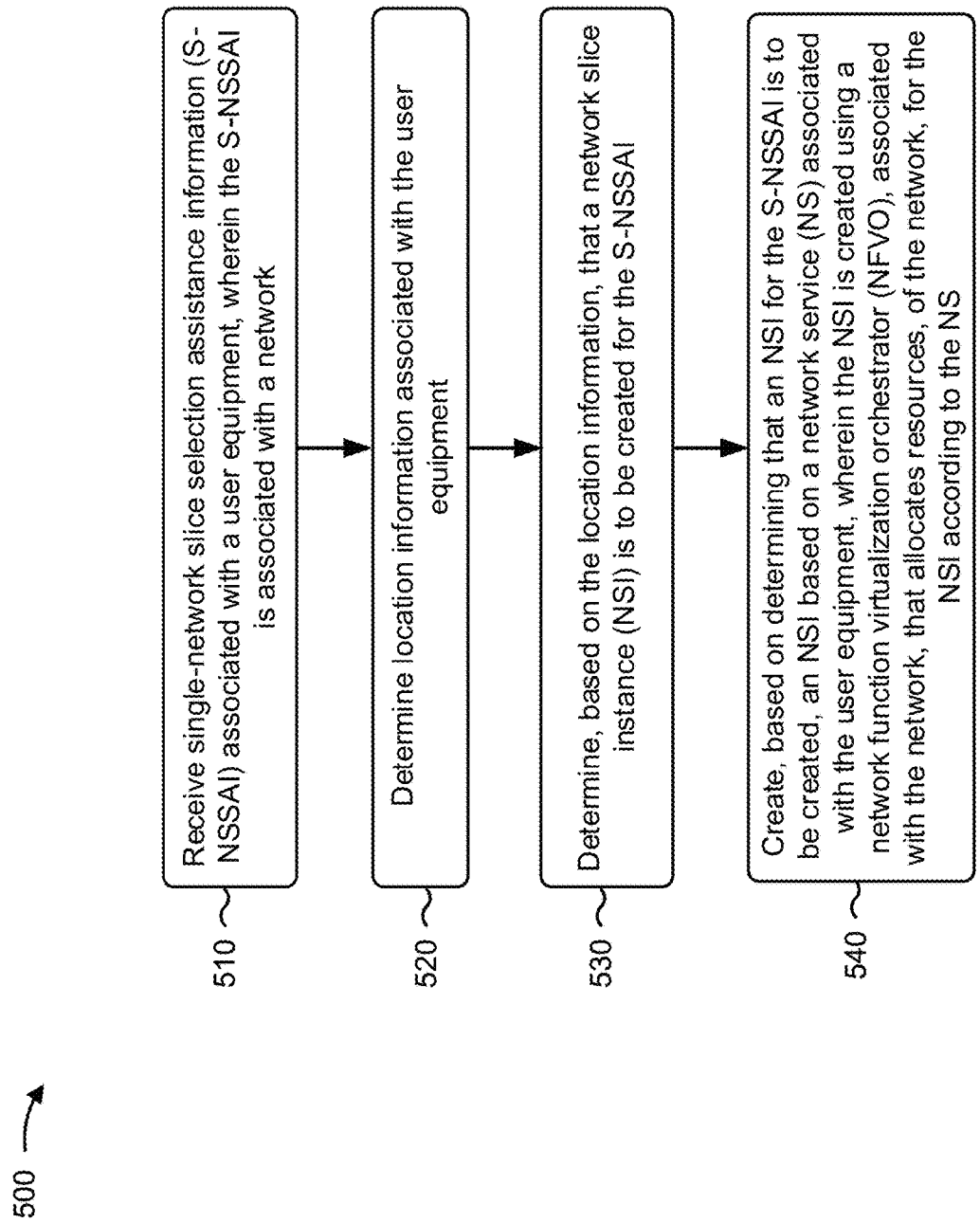
FIG. 5 is a flow chart of an example process for network slice instance creation.

FIG. 5 is a flow chart of an example process 500 for NSI creation. In some implementations, one or more process blocks of FIG. 5 can be performed by an NSSF (e.g., NSSF 302). In some implementations, one or more process blocks of FIG. 5 can be performed by another device or a group of devices separate from or including an NSSF (e.g., NSSF 302), a UE (e.g., UE 210), an RAN (e.g., RAN 220), a base station (e.g., base station 222), an AUSF (e.g., AUSF 304), a UDM (e.g., UDM 306), an NRF (e.g., 308), an NEF (e.g., NEF 310), an AF (e.g., AF 312), an AMF (e.g., AMF 314), a UDSF (e.g., UDSF 316), a PCF (e.g., PCF 318), a message bus (e.g., message bus 320), an SMF (e.g., SMF 322), and/or a UPF (e.g., SMF 324).

As shown in FIG. 5, process 500 can include receiving an S-NSSAI associated with a UE, wherein the S-NSSAI is associated with a network (block 510). For example, the NSSF, (e.g., using a processor 420, a memory 430, a storage component 440, an input component 450, and a communication interface 470, and/or the like) can receive an S-NSSAI associated with a UE, as described above. In some implementations, the S-NSSAI is associated with a network.

As further shown in FIG. 5, process 500 can include determining location information associated with the UE (block 520). For example, the NSSF (e.g., using a processor 420, a memory 430, a storage component 440, an input component 450, an output component 460, and a communication interface 470, and/or the like) can determine location information associated with the UE, as described above.

As further shown in FIG. 5, process 500 can include determining, based on the location information, that an NSI is to be created for the S-NSSAI (block 530). For example, the NSSF (e.g., using a processor 420, a memory 430, a storage component 440, an input component 450, and a communication interface 470, and/or the like) can determine, based on the location information, that an NSI is to be created for the S-NSSAI, as described above.

As shown in FIG. 5, process 500 can include creating, based on determining that an NSI for the S-NSSAI is to be created, an NSI based on an NS associated with the user equipment, wherein the NSI is created using an NFVO, associated with the network, that allocates resources, of the network, for the NSI according to the NS (block 540). For example, the NSSF (e.g., using a processor 420, a memory 430, a storage component 440, an output component 460, and a communication interface 470, and/or the like) can create, based on determining that an NSI for the S-NSSAI is to be created, an NSI based on a NS associated with the user equipment, as described above. In some implementations, the NSI is created using an NFVO, associated with the network, that allocates resources, of the network, for the NSI according to the NS.

Process 500 can include additional implementations, such as any single implementation or any combination of implementations described below and/or in connection with one or more other processes described elsewhere herein.

In some implementations, the S-NSSAI is received from an access and mobility function, associated with the network, based on at least one of a request to register the user equipment with the network, a request to provision the NS associated with the user equipment, or a request to update the NS associated with the user equipment. In some implementations, the NSSF, when determining that the NSI is to be created for the S-NSSAI, can determine that network functions associated with the S-NSSAI are not available at a location identified by the location information.

In some implementations, the NSSF, when determining that the NSI is to be created for the S-NSSAI, can determine that an NSI exists for the S-NSSAI and determine, based on a mapping of network functions available at a location identified by the location information, that the NSI is unavailable at the location. In some implementations, the mapping is maintained by the device.

In some implementations, the NSSF, when determining the location information, can determine that an NSI exists for the S-NSSAI and request a network repository function, of the network, to provide network functions associated with the NSI. In some implementations, the network functions are indicated as available at a location associated with the location information.

In some implementations, the NSSF, when creating the NSI, can assign an NSI identifier to the NSI; indicate, to the NFVO, that an NS instance, associated with the NS, is to be created; receive, from the NFVO, an NS instance identifier associated with the NS instance; and map the NSI identifier to the NS instance identifier to permit the user equipment to use the allocated resources for the NSI. In some implementations, the location information corresponds to a tracking area identifier of the network.

Although FIG. 5 shows example blocks of process 500, in some implementations, process 500 can include additional blocks, fewer blocks, different blocks, or differently arranged blocks than those depicted in FIG. 5. Additionally, or alternatively, two or more of the blocks of process 500 can be performed in parallel.

The foregoing disclosure provides illustration and description but is not intended to be exhaustive or to limit the implementations to the precise forms disclosed. Modifications and variations can be made in light of the above disclosure or can be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, single-network slice selection assistance information (S-NSSAI) associated with a user equipment,
      wherein the S-NSSAI is associated with a network;
   determining, by the device, location information associated with the user equipment;
   determining, by the device, whether the S-NSSAI is associated with an existing network slice instance (NSI) at a location identified by the location information;
   determining, by the device, that network functions associated with the S-NSSAI are not available at the location, based on the S-NSSAI not being associated with the existing NSI at the location or that the existing NSI at the location is unavailable;
   determining, by the device and based on determining that the network functions associated with the S-NSSAI are not available at the location, that an NSI is to be created for the S-NSSAI,
      wherein the network functions associated with the S-NSSAI are not associated with the existing NSI at the location; and
   creating, by the device and based on determining that an NSI for the S-NSSAI is to be created, a new NSI based on a network service (NS) associated with the user equipment,
      wherein the new NSI is created using a network function virtualization orchestrator (NFVO), associated with the network, that allocates resources, of the network, for the new NSI according to the NS, and
      wherein the new NSI is randomly assigned;
   assigning, by the device, an NSI identifier to the new NSI;
   indicating, by the device and to the NFVO, that an NS instance, associated with the NS, is to be created;
   receiving, by the device and from the NFVO, an NS instance identifier associated with the NS instance; and
   mapping, by the device, the NSI identifier to the NS instance identifier to permit the user equipment to use allocated resources for the new NSI.

2. The method of claim 1, wherein the S-NSSAI is received from an access and mobility function, associated with the network, based on at least one of:
   a request to register the user equipment with the network,
   a request to provision the NS associated with the user equipment, or
   a request to update the NS associated with the user equipment.

3. The method of claim 1, wherein determining that an NSI is to be created for the S-NSSAI comprises:
   determining that an NSI exists for the S-NSSAI; and
   determining, based on a mapping of network functions available at the location, that the existing NSI at the location is unavailable,
      wherein the mapping is maintained by the device.

4. The method of claim 1, wherein determining the location information comprises:
   determining that an NSI exists for the S-NSSAI; and
   requesting a network repository function, of the network, to provide network functions associated with the existing NSI at the location,
      wherein the network functions associated with the existing NSI at the location are indicated as available at the location.

5. The method of claim 1, wherein the location information corresponds to a tracking area identifier of the network.

6. A device, comprising:
   one or more memories; and
   one or more processors, communicatively coupled to the one or more memories, to:
      receive single-network slice selection assistance information (S-NSSAI) associated with a user equipment,
         wherein the S-NSSAI is associated with a network;
      determine location information associated with the user equipment;
      determine whether the S-NSSAI is associated with an existing network slice instance (NSI) at a location identified by the location information;
      determine that network functions associated with the S-NSSAI are not available at the location, based on the S-NSSAI not being associated with the existing NSI at the location or that the existing NSI at the location is unavailable;
      determine, based on determining that the network functions associated with the S-NSSAI are not available at the location, that an NSI is to be created for the S-NSSAI,
         wherein the network functions associated with the S-NSSAI are not associated with the existing NSI at the location;
      create based on determining that an NSI for the S-NSSAI is to be created, a new NSI based on a network service (NS) associated with the user equipment,
         wherein the new NSI is created using a network function virtualization orchestrator (NFVO), associated with the network, that allocates resources, of the network, for the new NSI according to the NS, and
         wherein the new NSI is randomly assigned;
      assign an NSI identifier to the new NSI;
      indicate, to the NFVO, that an NS instance, associated with the NS, is to be created;
      receive from the NFVO, an NS instance identifier associated with the NS instance; and
      map the NSI identifier to the NS instance identifier to permit the user equipment to use allocated resources for the new NSI.

7. The device of claim 6, wherein the S-NSSAI is received from an access and mobility function, associated with the network, based on at least one of:
   a request to register the user equipment with the network,
   a request to provision the NS associated with the user equipment, or
   a request to update the NS associated with the user equipment.

8. The device of claim 6, wherein the one or more processors, when determining that the NSI is to be created for the S-NSSAI, are to:
   determine that an NSI exists for the S-NSSAI; and
   determine, based on a mapping of network functions available at the location, that the existing NSI at the location is unavailable,
      wherein the mapping is maintained by the device.

9. The device of claim 6, wherein the one or more processors, when determining the location information, are to:
   determine that an NSI exists for the S-NSSAI; and
   request a network repository function, of the network, to provide network functions associated with the existing NSI at the location, wherein the network functions associated with the existing NSI at the location are indicated as available at the location.

10. The device of claim 6, wherein the location information corresponds to a tracking area identifier of the network.

11. A non-transitory computer-readable medium storing instructions, the instructions comprising:
one or more instructions that, when executed by one or more processors, of a device, cause the one or more processors to:
receive single-network slice selection assistance information (S-NSSAI) associated with a user equipment, wherein the S-NSSAI is associated with a network;
determine location information associated with the user equipment;
determine whether the S-NSSAI is associated with an existing network slice instance (NSI) at a location identified by the location information;
determine that network functions associated with the S-NSSAI are not available at the location, based on the S-NSSAI not being associated with the existing NSI at the location or the existing NSI at the location is unavailable;
determine based on determining that the network functions associated with the S-NSSAI are not available at the location, that an NSI is to be created for the S-NSSAI,
wherein the network functions associated with the S-NSSAI are not associated with the existing NSI at the location;
create based on determining that an NSI for the S-NSSAI is to be created, a new NSI based on a network service (NS) associated with the user equipment,
wherein the new NSI is created using a network function virtualization orchestrator (NFVO), associated with the network, that allocates resources, of the network, for the new NSI according to the NS, and
wherein the new NSI is randomly assigned;
assign an NSI identifier to the new NSI;
indicate, to the NFVO, that an NS instance, associated with the NS, is to be created;
receive, from the NFVO, an NS instance identifier associated with the NS instance; and
map the NSI identifier to the NS instance identifier to permit the user equipment to use allocated resources for the new NSI.

12. The non-transitory computer-readable medium of claim 11, wherein the S-NSSAI is received from an access and mobility function, associated with the network, based on at least one of:
a request to register the user equipment with the network,
a request to provision the NS associated with the user equipment, or
a request to update the NS associated with the user equipment.

13. The non-transitory computer-readable medium of claim 11, wherein the one or more instructions, that cause the one or more processors to determine that the NSI is to be created for the S-NSSAI, cause the one or more processors to:
determine that an NSI exists for the S-NSSAI; and
determine, based on a mapping of network functions available at the location, that the existing NSI at the location is unavailable
wherein the mapping is maintained by the device.

14. The non-transitory computer-readable medium of claim 11, wherein the one or more instructions, that cause the one or more processors to determine the location information, cause the one or more processors to:
determine that an NSI exists for the S-NSSAI; and
request a network repository function, of the network, to provide network functions associated with the existing NSI at the location,
wherein the network functions associated with the existing NSI at the location are indicated as available at the location.

15. The method of claim 3, further comprising:
periodically synchronizing the mapping of network functions available at the location based on an event.

16. The method of claim 5, further comprising:
tracking the network functions associated with the existing NSI at the location using the tracking area identifier.

17. The device of claim 8, wherein the one or more processors are further to:
periodically synchronize the mapping of network functions available at the location based on an event.

18. The device of claim 10, wherein the one or more processors are further to:
track the network functions associated with the existing NSI at the location using the tracking area identifier.

19. The non-transitory computer-readable medium of claim 11, wherein the location information corresponds to a tracking area identifier of the network.

20. The non-transitory computer-readable medium of claim 19, where the one or more instructions, when executed by the one or more processors, further cause the one or more processors to:
track the network functions associated with the existing NSI at the location using the tracking area identifier.

* * * * *